United States Patent
Portelance et al.

(10) Patent No.: US 7,404,568 B1
(45) Date of Patent: Jul. 29, 2008

(54) FLIP-DOWN FOOTRESTS FOR AN ALL-TERRAIN VEHICLE

(75) Inventors: Martin Portelance, Sherbrooke (CA); Daniel Nadeau, St-Denis de Brompton (CA); Eric Dube, Magog (CA); Mathieu Audet, Montreal (CA); Jamie Ibbett, Montreal (CA)

(73) Assignee: Bombardier Recreational Products Inc., Valcourt (CA)

( * ) Notice: Subject to any disclaimer, the term of this patent is extended or adjusted under 35 U.S.C. 154(b) by 277 days.

(21) Appl. No.: 11/072,640

(22) Filed: Mar. 7, 2005

Related U.S. Application Data

(60) Provisional application No. 60/551,493, filed on Mar. 8, 2004.

(51) Int. Cl.
*B62K 5/00* (2006.01)
(52) U.S. Cl. .................. 280/291; 280/89.1; 180/908
(58) Field of Classification Search ............... 280/291; 180/908, 89.1, 90.6
See application file for complete search history.

(56) References Cited

U.S. PATENT DOCUMENTS

| | | | |
|---|---|---|---|
| 4,546,993 A * | 10/1985 | Walker ........................ 280/291 |
| 5,458,038 A | 10/1995 | Kurosaki |
| 5,893,424 A | 4/1999 | Hisada |
| 6,113,121 A | 9/2000 | Mizuta |
| 6,270,106 B1 * | 8/2001 | Maki et al. .................. 280/291 |
| 6,478,103 B1 | 11/2002 | Matsuura |
| 6,588,529 B2 | 7/2003 | Ishii et al. |
| 6,634,694 B2 | 10/2003 | Matsushita |
| 6,682,085 B2 | 1/2004 | Furuhashi et al. |
| 6,712,172 B2 * | 3/2004 | Inagaki et al. ............... 180/292 |
| 6,755,269 B1 * | 6/2004 | Davis et al. ................. 180/89.1 |
| 6,782,963 B2 * | 8/2004 | Hori et al. .................... 180/233 |
| 6,843,495 B2 | 1/2005 | Tokumura et al. |
| 6,968,917 B2 * | 11/2005 | Rondeau et al. ............. 180/89.1 |
| 7,121,371 B2 * | 10/2006 | Rondeau et al. ............. 180/89.1 |
| 2004/0108158 A1 | 6/2004 | Rondeau et al. |
| 2004/0108159 A1 | 6/2004 | Rondeau et al. |
| 2004/0112658 A1 | 6/2004 | Rondeau et al. |
| 2004/0112668 A1 | 6/2004 | Rondeau et al. |
| 2004/0113389 A1 | 6/2004 | Rondeau et al. |
| 2004/0129485 A1 * | 7/2004 | Rondeau et al. ............. 180/312 |
| 2004/0134707 A1 | 7/2004 | Rondeau et al. |
| 2004/0135342 A1 | 7/2004 | Rondeau et al. |

FOREIGN PATENT DOCUMENTS

WO          WO 3042026 A1 *   5/2003

* cited by examiner

*Primary Examiner*—Kevin Hurley
(74) *Attorney, Agent, or Firm*—Osler, Hoskin & Harcourt LLP

(57) ABSTRACT

A two-seater all-terrain vehicle (ATV) has straddle-type driver and rear passenger seats, and a pair of movable rear footrests to support the feet of a rear passenger. The rear footrests pivot from a stowed non-supporting position to a supporting position. When folded into the non-supporting position, the rear footrests become substantially flush with side paneling of the vehicle. The all-terrain vehicle may further include a pair of vertical and horizontal adjustment mechanisms for independently vertically adjusting each of the rear passenger footrests so that passengers of varying height can be comfortably accommodated on the rear seat. A cargo space is provided under the passenger's footrest, the cargo space being enlarged when the passenger's footrests are in the stowed position. Restraints and other holding mechanisms are also provided. The flip-down adjustable rear footrests may be used on other types of straddle-type recreational vehicles.

16 Claims, 9 Drawing Sheets

US 7,404,568 B1

FLIP-DOWN FOOTRESTS FOR AN ALL-TERRAIN VEHICLE

CROSS-REFERENCE

The present application claims priority from U.S. Provisional Patent Application No. 60/551,493 filed Mar. 8, 2004 entitled FLIP-DOWN FOOTREST FOR AN ALL-TERRAIN VEHICLE, which is incorporated herein by reference.

TECHNICAL FIELD

The present invention relates generally to all-terrain vehicles (ATVs) and, in particular, to two-seater all-terrain vehicles having passenger footrests.

BACKGROUND OF THE INVENTION

As illustrated in FIG. 1, a typical prior-art all-terrain vehicle (ATV) denoted generally by reference numeral 100 has a straddle-type seat disposed on an upper portion of the vehicle's frame. A driver 110 usually rests his feet on a pair of footrests 140 that extend laterally from a lower portion of the frame between the front and rear wheels. The footrest 140 is connected between a front fender 150 and a rear fender 160. Although a passenger 120 can squeeze onto the straddle-type seat behind the driver or sit on a rear rack 130 above and slightly forward of a rear wheel axle 170, as shown in FIG. 1, this arrangement is generally uncomfortable for the rear passenger especially when the ATV traverses rough terrain and is strongly discouraged by manufacturers because the vehicle is less stable. Furthermore, as depicted in FIG. 2, there is not much room on the single pair of footrests for both the driver's feet and the passenger's feet, leading to further discomfort and passenger instability. Moreover, when a passenger attempts to share the single pair of footrests with the driver, the passenger's toes have a propensity to point outwardly from the vehicle. The passenger's toes are thus prone to hitting rocks, trees, bushes and other obstacles as the ATV traverses rough terrain. Many problems existed with this configuration. In an after market passenger seat kit 101 an optional foot peg 145 can be positioned on steel tube 147 optionally added between rear rack 130 and the frame. In other such conventional situations, it could be appreciated from FIG. 3, the feet of the passenger cannot touch the driver footrests at all because of the higher passenger sitting position. As illustrated in FIG. 3, the after market rear passenger seat 101 installed on rear rack 130 is a distinct straddle-type seat with armrests 104 and a backrest so that the passenger sits above and slightly rearward of the rear wheel axle 107. The unsupported passenger feet may be uncomfortable for the passenger and does not provide the support needed when the vehicle moves on an uneven terrain.

Accordingly, a two-seater all-terrain vehicle was developed with a longer wheelbase A and a rear passenger seat 1300 for comfortably and securely accommodating a rear passenger. The two-seater ATV was the subject of U.S. Provisional Patent Application No. 60/475,511 entitled ATV WITH IMPROVED DRIVER POSITIONING AND/OR MULTI PASSENGER CAPACITY filed Jun. 4, 2003; U.S. Provisional Patent Application No. 60/393,114 entitled ATV WITH IMPROVED DRIVER POSITIONING AND/OR MULTI PASSENGER CAPACITY filed Jul. 3, 2002; U.S. Provisional Patent Application No. 60/384,822 entitled ATV WITH IMPROVED DRIVER POSITIONING AND/OR MULTI PASSENGER CAPACITY filed Jun. 4, 2002; U.S. Provisional Patent Application No. 60/331,252 entitled ATV WITH IMPROVED DRIVER POSITIONING AND/OR MULTI PASSENGER CAPACITY filed Nov. 13, 2001; U.S. Regular patent application Ser. Nos. 10/647,782, 10/647,778, 10/647,786, 10/647,780, 10/647,785, 10/647,781, 10/647,779, 10/647,788, 10/647,787 and 10/647,777 all filed on Aug. 26, 2003. All the above-mentioned documents are incorporated by reference herein in their entireties.

The prior-art extended wheel base two-seater ATV provides footrests for the rear passenger that could be improved. On prior-art extended wheel base two-seater ATVs, a pair of fixed foot rests (not shown) are disposed on each side of the vehicle's frame. These passenger footrests cannot be moved. However, the pair of passenger's footrests extending from either side of the frame could more adequately and comfortably support the passenger's feet. Furthermore, the footrest could be foot pegs attached to the frame at a fixed height and thus could hardly provide a more adequate ergonomic for short or tall passengers. Moreover, when there is no passenger riding on the vehicle, the passenger foot pegs take up valuable potential cargo space particularly due to their higher position.

Thus, there is a need for an improved pair of footrests for passengers on two-seater all-terrain vehicles.

SUMMARY OF THE INVENTION

It is therefore an object of the present invention to provide an improved footrest for an all-terrain vehicle that overcomes at least one of the deficiencies of the prior art.

An aspect of the present invention provides a two seater all-terrain vehicle with footrests for a passenger having a surface for supporting a large part of the feet of the passenger, the footrests being adjustable in height. The inclination of the footrests in different directions is also adjustable to better fit the ergonomics of the passenger. The passenger's footrests are movable so that substantially flush with the side panel of the vehicle when in the stowed position to avoid obstruct the volume behind the driver's feet thus providing a larger cargo volume. The passenger's footrest can have a volume large enough to provide a storage compartment. If the passenger's footrest can also cover a storage volume underneath the footrest. In the latter case, the footrest can serve as a pivotable lid closing the storage compartment. The storage compartment would ideally be sealed to prevent water intrusion in the cargo space.

In accordance with a first aspect of the invention, an all-terrain vehicle is provided which includes a frame having a straddle-type seat; a plurality of wheels supported by the frame; each wheel suitable to accommodate a low pressure balloon tire generally supporting a pressure of less than 2 kg·cm$^2$; a drive assembly supported by the frame including an engine operatively connected to at least one of the plurality of wheels to impart drive power to the at least one wheel; and a footrest movable between a supporting position and a non-supporting position. Preferably, the vehicle further includes an adjustment mechanism for vertically and horizontally adjusting the footrest so that passengers of varying size can be comfortably accommodated. The footrest, when in the non-supporting position, are positioned in a side fairing recess. The recess can receive a portion of the footrest or the entirety of the footrest to remove the unused footrest from a useful volume on the vehicle. Inserting the footrests in a recess also favorably improve the aesthetic of the vehicle.

In accordance with another aspect of the invention, an all-terrain vehicle is provided which includes an elongated frame having a forward straddle-type seat for accommodating a driver and a rear straddle-type seat for accommodating a passenger; a plurality of wheels supported by the elongated frame and defining an increased distance between the front axle and the rear axle. This longer distance between the front and the rear axle is commonly called "elongated wheelbase" which is usually between 132 cm and 183 cm long. The all-terrain vehicle also includes a drive assembly supported by the frame including an engine operatively connected to at least one of the plurality of wheels to impart drive power to the at least one wheel; a pair of driver footrests for the driver's feet; and a pair of passenger footrests for the passenger's feet, the pair of passenger footrests being movable between a supporting position and a non-supporting position. Preferably, the vehicle further includes an adjustment mechanism for vertically and horizontally adjusting the footrest so that passengers of varying size can be comfortably accommodated. The elongated wheelbase of the ATV accommodates the driver and passenger seats as well as the driver and passenger footrests.

In accordance with yet another aspect of the invention, a straddle-type recreational vehicle is provided which includes a frame including at least one straddle-type seat accommodating a driver and a rear passenger; an engine mounted to the frame for imparting drive power to the vehicle; a pair of driver footrests; at least one pair of passenger footrests movable between a first position and a second position. Preferably, the passenger footrests may pivotally fold from a supporting position to a non-supporting position and/or are vertically and horizontally adjustable to accommodate passengers of varying height. By folding the passenger footrests into the non-supporting position, cargo may be stored in the space that would otherwise be occupied by the passenger footrests in the supporting position. When the multi-seat ATV is not carrying any passengers, cargo may be stored behind the driver by removing or folding the rear passenger seat(s) to accommodate a storage rack or modular container in which case the passenger footrests need not be folded into the non-supporting position. Different concepts for using the passenger seat space are included in U.S. patent application Ser. No. 10/796,371, filed Mar. 8, 2004 entitled MODULAR COMPONENTS FOR AN ATV. This application is incorporated herein by reference in its entirety.

It is one aspect of the invention to provide a passenger footrest moving from a vertical non-foot supporting position to an horizontal foot-supporting position having a locking mechanism that secures the foot-rest in either position. The locking mechanism can also maintain the foot-rest in an intermediate position if needed.

One other aspect of the present invention has a recessed portion on the vehicle's side wall accommodating the footrest when in a stowed non-foot supporting position. The recess is sized and designed to receive all of the footrest or just part of it so the retracted footrest does not extend outside the vehicle's side fairing.

In accordance with yet another aspect of the present invention, a cargo volume is defined under the passenger footrest, the cargo volume being enlarged when the passenger's footrest is in the stowed position. The vehicle is suitable to receive a restraint for securing cargo on the cargo volume. Hooks, belts, rubber band and anchors are all provided with the cargo volume to secure the cargo.

It is one other aspect of the present invention to provide a storage compartment in the passenger footrest. The compartment is enclosed by a lid which is secured by a mechanical fastener. The mechanical fastener can posses a lock to ensure protection of goods inside the storage compartment. Ideally the storage compartment is sealed when the lid is secured to prevent water intrusion in the cargo volume.

One further aspect of the present invention provide a removable passenger footrest enclosed cargo compartment. The cargo compartment is removable while either keeping the footrest on the vehicle or removing the footrest form the vehicle.

One aspect of the present invention provides passenger footrests having multiple adjustments for the height as well as for the horizontal inclination. A locking mechanism maintains the footrests in the desired position.

Further features and advantages of the present invention will become apparent from the following detailed description, taken in combination with the appended drawings.

BRIEF DESCRIPTION OF THE DRAWINGS

Further features and advantages of the present invention will become apparent from the following detailed description, take in combination with the appended drawings, in which.

It will be noted that throughout the appended drawings, like features are identified by like reference numerals.

DETAILED DESCRIPTION OF PREFERRED EMBODIMENTS

Figure 1:
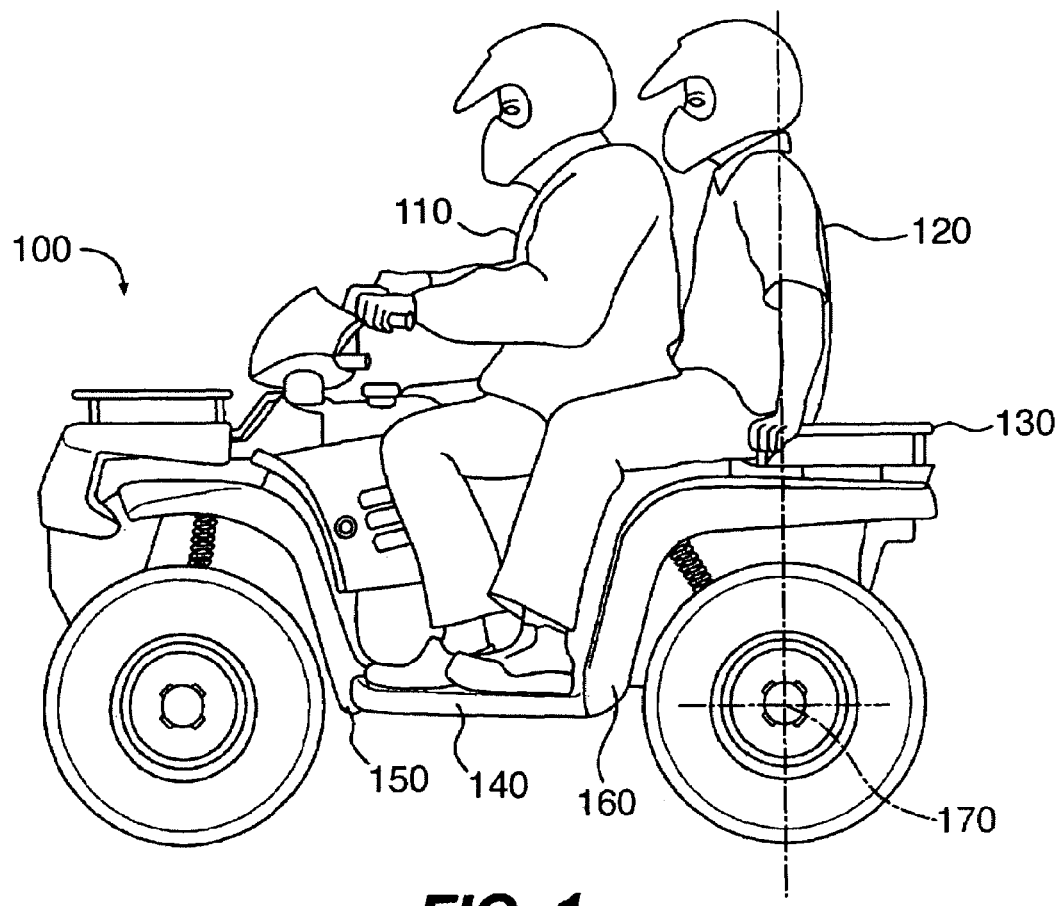
FIG. 1 is a side elevation view of a prior-art ATV with a driver and a passenger sitting on a single straddle-type seat.
Figure 2:
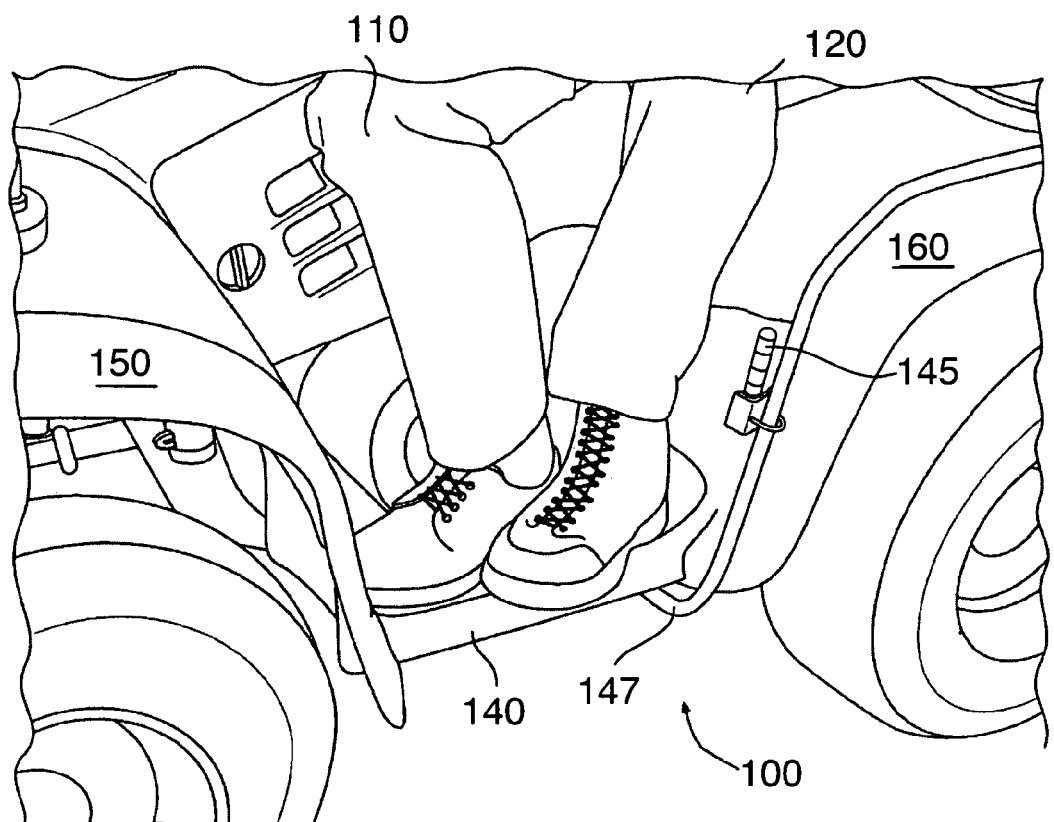
FIG. 2 is a close-up perspective view of a prior-art footrest supporting both a driver's foot and a passenger's foot for the seating arrangement shown in FIG. 1.
Figure 3:
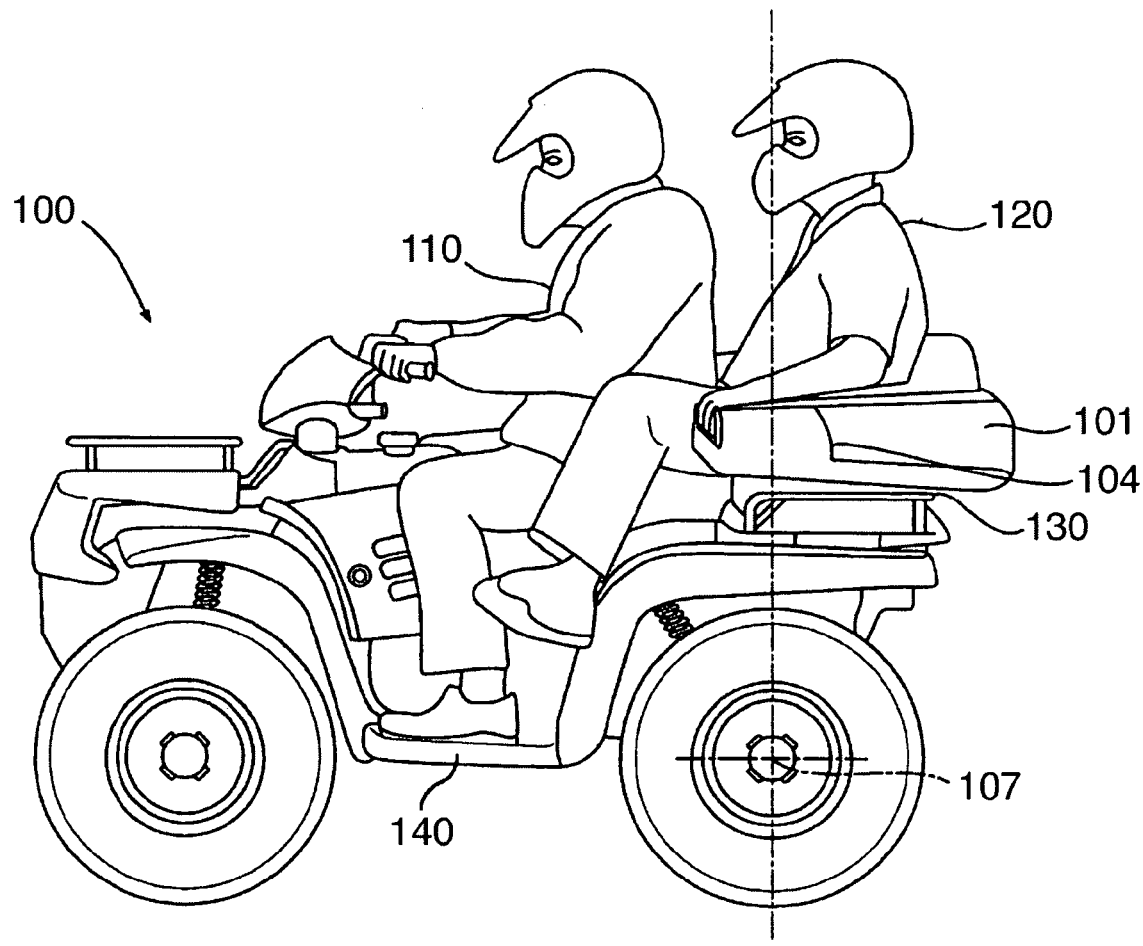
FIG. 3 is a left side elevation view of a prior-art two-seater ATV accommodating a driver seat and an after-market passenger seat installed on the rear rack.
Figure 4:
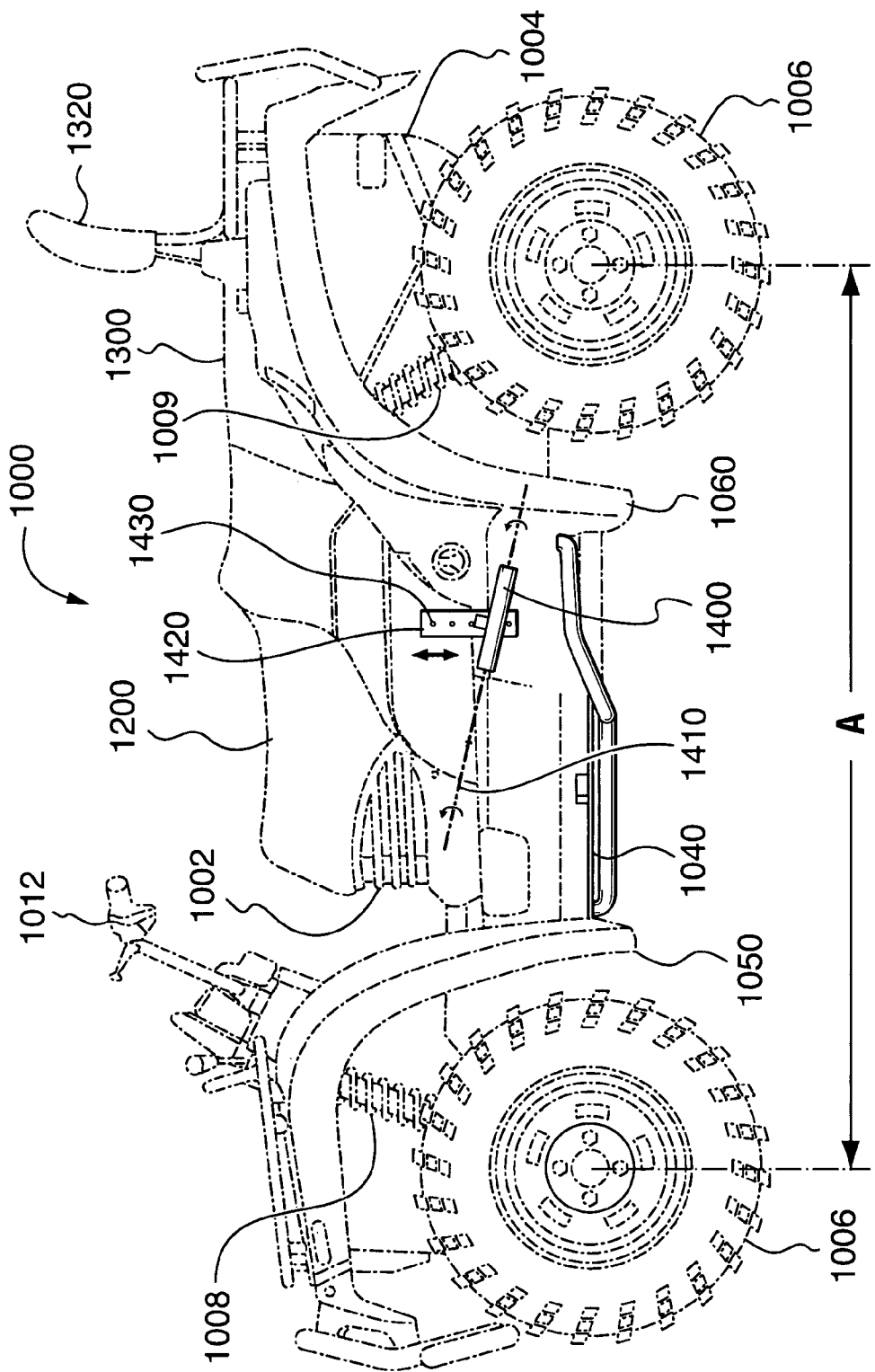
FIG. 4 is a left side elevation view of a prior art elongated frame ATV showing a pivotally foldable rear passenger footrest in accordance with an embodiment of the present invention and also an adjustment mechanism for vertically adjusting the height and the horizontal angle of the footrests to accommodate passengers of varying height in accordance with a further embodiment of the present invention.

FIG. 4 illustrates a first embodiment in accordance with the present invention in which an all-terrain vehicle 1000 includes an engine 1002 mounted to a frame 1004 for driving the vehicle by imparting torque to either two of the four wheels 1006 or all four wheels. The front and rear wheels are connected to the frame via front and rear suspension systems 1008, 1009, respectively. The wheel preferably have low-pressure balloon tires (i.e. less than 2 kg/cm$^2$). A driver sits on a straddle-type driver seat 1200 and steers the front wheels with handlebars 1012 which are connected to the front wheels via a steering linkage (not shown). The wheelbase A of the two-seater ATV is longer than the wheelbase of standard single seater ATV. The wheelbase A should be long enough to provide enough room between front fender 1050 and rear fender 1060 to accommodate the driver feet and the passenger feet one behind the other. The extended wheelbase is preferably about 165 cm long in a preferred embodiment. Other embodiments could also use a wheelbase between 132 cm and 183 cm.

Figure 8:
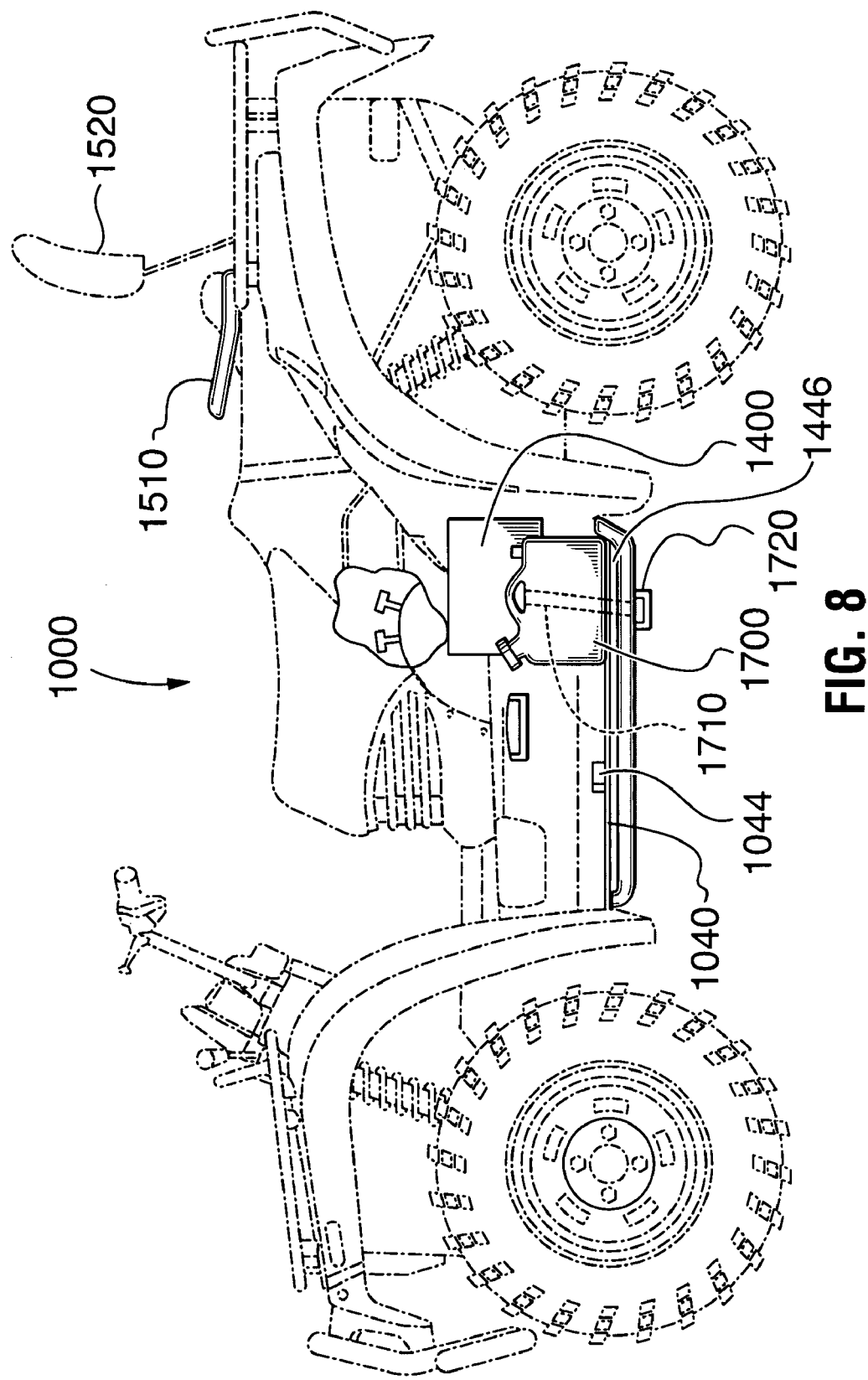
FIG. 8 is a left side elevation view of an ATV with the passenger footrest folded up into the non-supporting position to accommodate cargo on a rear portion of the cargo support.
Figure 9:
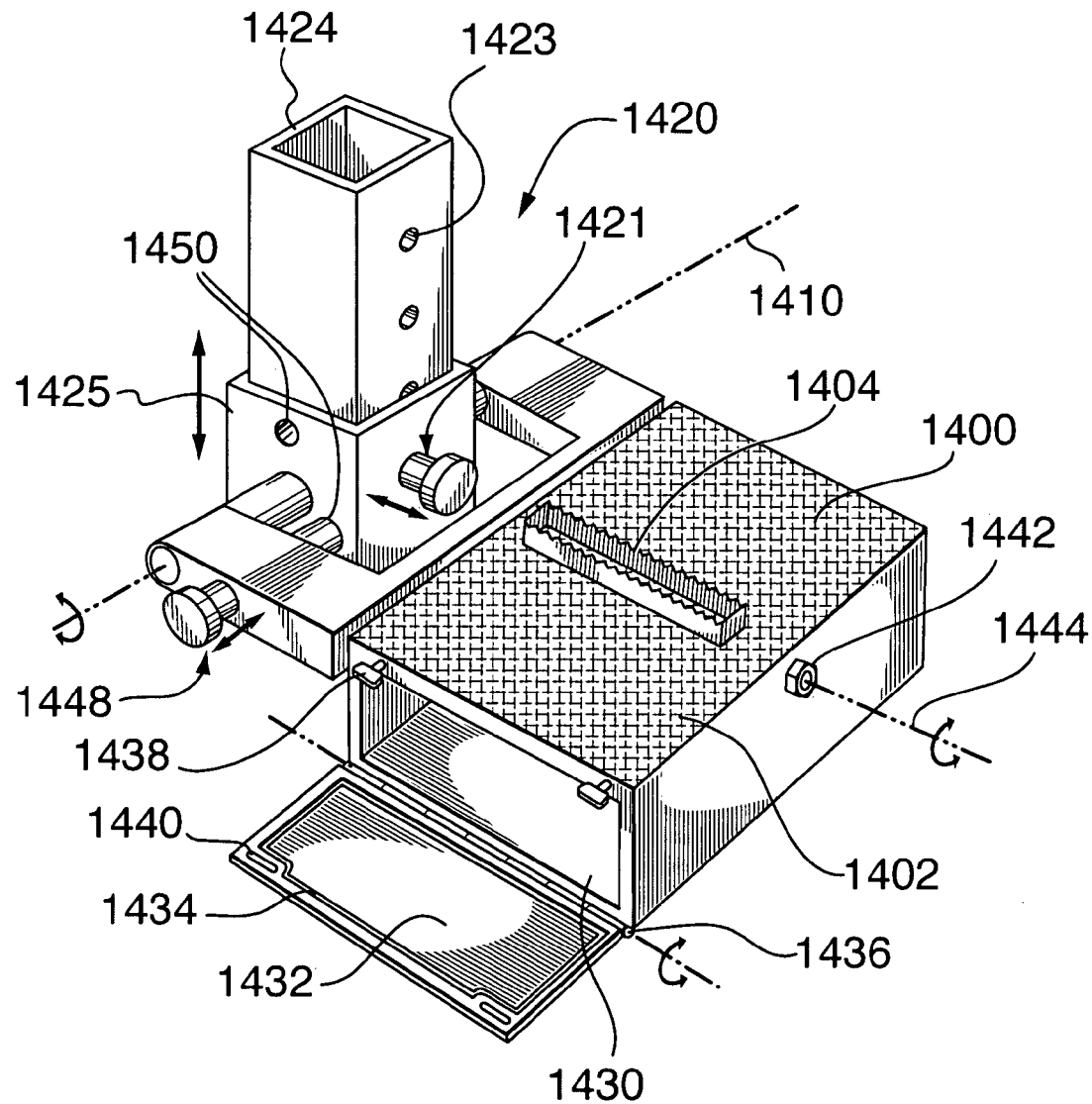
FIG. 9 is a perspective view of a vertical adjustment mechanism of a footrest including a storage compartment for use on an ATV in accordance with an embodiment of the present invention.

The ATV shown in FIG. 4 is a two-seater ATV since it further includes a rear passenger seat 1300 with a backrest 1320. The passenger grips the grab handles 1510 (best seen in FIG. 8) positioned laterally outwardly of the passenger seat 1300. The driver rests his feet on a pair of driver footrests 1040 which are affixed to the frame in a usual manner. The rear passenger rests his feet on a pair of passenger footrests 1400. The passenger footrests are independently pivotally connected to the frame and are able to pivot about an axis of rotation 1410 from a supporting position which is generally horizontal (as shown in FIG. 4) to a non-supporting position (which is generally vertical). The ATV 1000 further includes an adjustment mechanism for independently vertically adjusting the passenger footrests to accommodate passengers of varying height. The vertical adjustment mechanism may be a ratchet-like system having a plurality of notches 1430 permitting the passenger footrests to be raised or lowered with ease. Alternatively, the vertical adjustment mechanism 1420 may be a plunger-and-hole mechanism (as depicted in FIG. 9) where a spring-loaded plunger 1421 with a knob 1422 is able to mate with one of a plurality of vertically spaced holes 1423 in a box beam 1424 affixed to the vehicle frame. The footrest 1400 is affixed to a square collar 1425 that may translate vertically with respect to the box beam when the knob is pulled and the plunger is withdrawn from the hole. In this embodiment, to fold the footrest into the non-supporting (i.e. stowed) position, the footrest must first be raised to the top hole (to give the needed rotational clearance). It may also be possible to modify the driver footrest or running board to provide sufficient lower clearance to permit the footrest to be folded downward instead of upward. Alternatively, axis 1410 could be moved closer to the footrest to ensure proper clearance without having to raise the footrest to the top hole. Movement of the footrest from a foot supporting position to a non-foot supporting position is locked by a spring-loaded plunger 1448 with a knob that is able to mate with one of a plurality of holes 1450 in a box beam 1424 affixed to the vehicle frame.

As shown in FIG. 4, not only are the footrests pivotable and vertically adjustable, but the angle of inclination (or "angle of attack") of the footrests may also be adjusted so as to adapt the inclination angle of the footrest to a comfortable or ergonomic angle. As depicted in FIG. 9, a nut 1442 is tighten to prevent rotational movement over axis 1444. Movement over axis 1444 provides an horizontal adjustment of the footrest. Other kind of mechanisms providing height or angle adjustments could be used without departing from the scope of the present invention.

While the left and right passenger footrests are preferably independently pivotable, inclinable and vertically adjustable, it would be possible to devise a mechanism (not shown) to kinematically couple the left and right passenger footrests so that they move in unison, i.e. so that pivoting, inclining or vertically adjusting one passenger footrest causes the counterpart passenger footrest to pivot, incline or vertically adjust in an identical manner.

Figure 5:
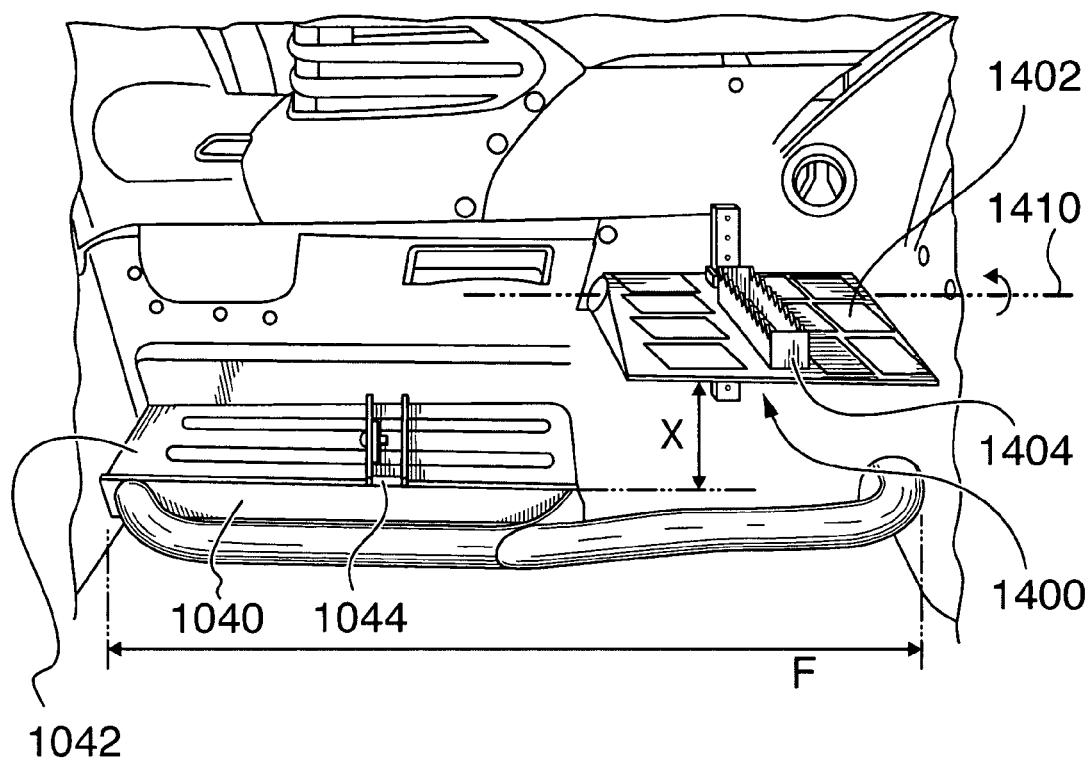
FIG. 5 is a close-up perspective view of pivotally foldable footrest shown in FIG. 4.

Depicted in FIG. 5 is a close-up perspective view of driver and passenger footrests. The driver footrest 1040 has an anti-skid surface topography 1042 and a cleat or crenellated member 1044 for providing traction to the sole of a driver's shoe or boot. Likewise, the passenger footrest 1400, which is able to pivot about the axis of rotation 1410, has an anti-skid surface 1402 and a cleat or crenellated member 1404 to provide good traction or grip to the sole of the passenger's shoe or boot. Since the rear passenger 1020 sits higher than the driver 1010, the rear footrests 1400 are, on average, higher than the driver footrests 1040 by a vertical distance X which will depend on the precise configuration of the vehicle. The driver footrests 1040 and the passenger footrests 1400 sit between the front fender 1050 and the rear fender 1060 and define a foot well of length F, which is also determined by the exact vehicle configuration. It is standard to disposed the passenger seat a little higher than the driver seat to allow the passenger to see in forward direction over the driver.

Figure 6:
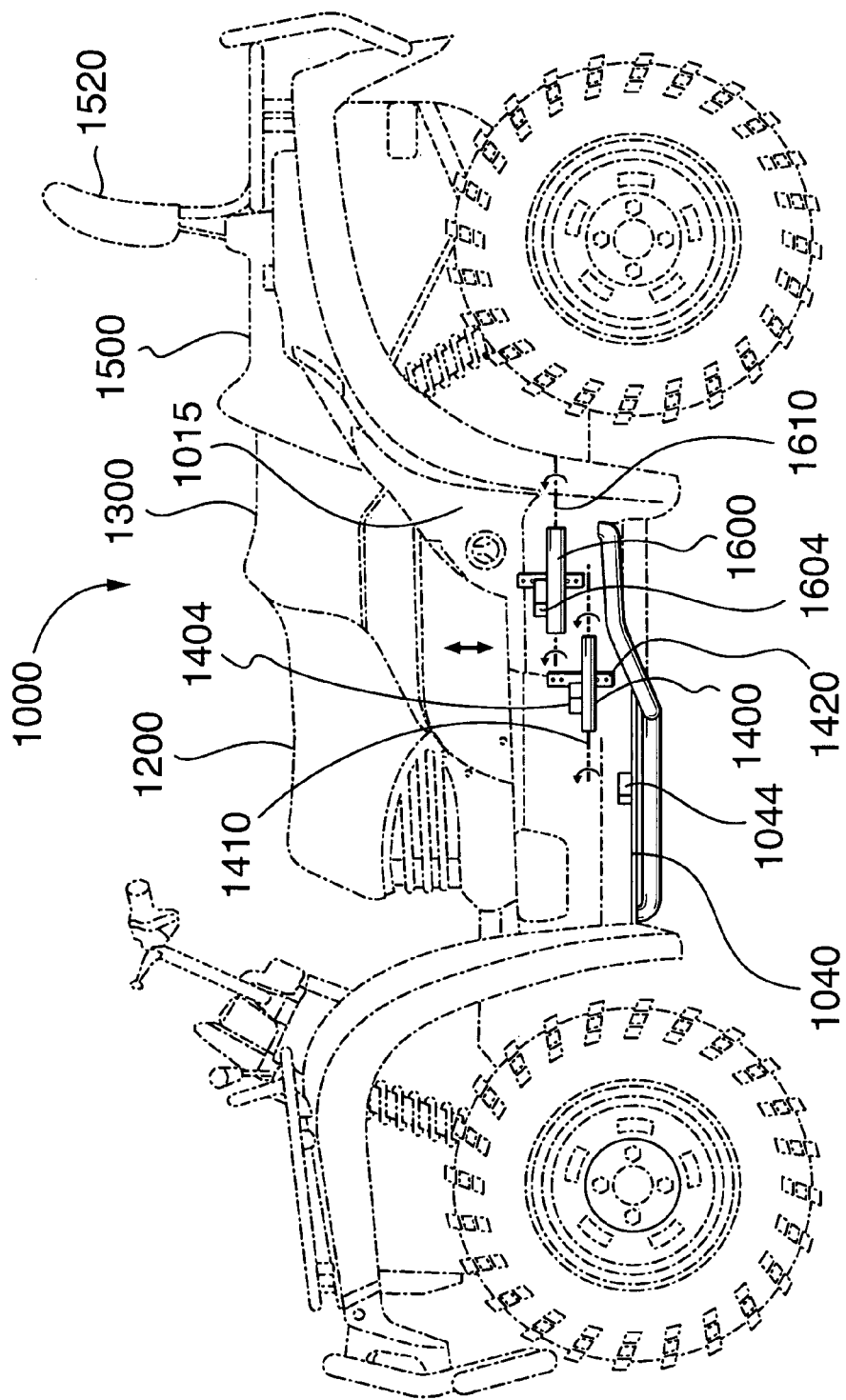
FIG. 6 is a left side elevation view of another embodiment of the present invention in which a three-seat ATV has two pairs of passenger footrests in addition to a pair of driver footrests.

A second embodiment is shown in FIG. 6 in which the ATV 1000 has three straddle-type seats, namely the driver seat 1200, a first passenger seat 1300 and a second passenger seat 1500. The second passenger seat has a backrest 1520. As in the first embodiment, the driver rests his feet on the driver footrests 1040 which has a cleat 1044. A first passenger (who sits on the first passenger seat 1300) rests his feet on a first pair of passenger footrests 1400 while a second passenger (who sits on the second passenger seat 1500) rests his feet on a second pair of passenger footrests 1600. Both the first passenger footrests 1400 and the second passenger footrests 1600 are able to pivot about respective axes of rotation 1410, 1610. Furthermore, both the first and second passenger footrests have cleats 1404, 1604 for providing traction and grip and for engaging the heel of a sole or boot to ensure that the passengers sit comfortably and securely on the ATV (which is especially important when traversing rough terrain). As illustrated in FIG. 6, the first and second passenger footrests may also be vertically adjustable. A pair of vertical adjustment mechanisms may be provided (as was shown in FIG. 4) to ensure that both pairs of passenger footrests may be adjusted to accommodate passengers of different heights. An horizontal adjustment mechanism provides the passenger's footrest to adapt to the specific ergonomic of the passenger by preferably inclining rearward the foot rest.

Still referring to FIG. 6, a first storage area is configured under the first passenger footrest 1400 and a second storage area is configured under the second passenger footrest 1600. The addition of the volume behind the driver's footrest 1040 provides a large storage volume when both passenger's footrests are in the stowed configuration.

Figure 7:
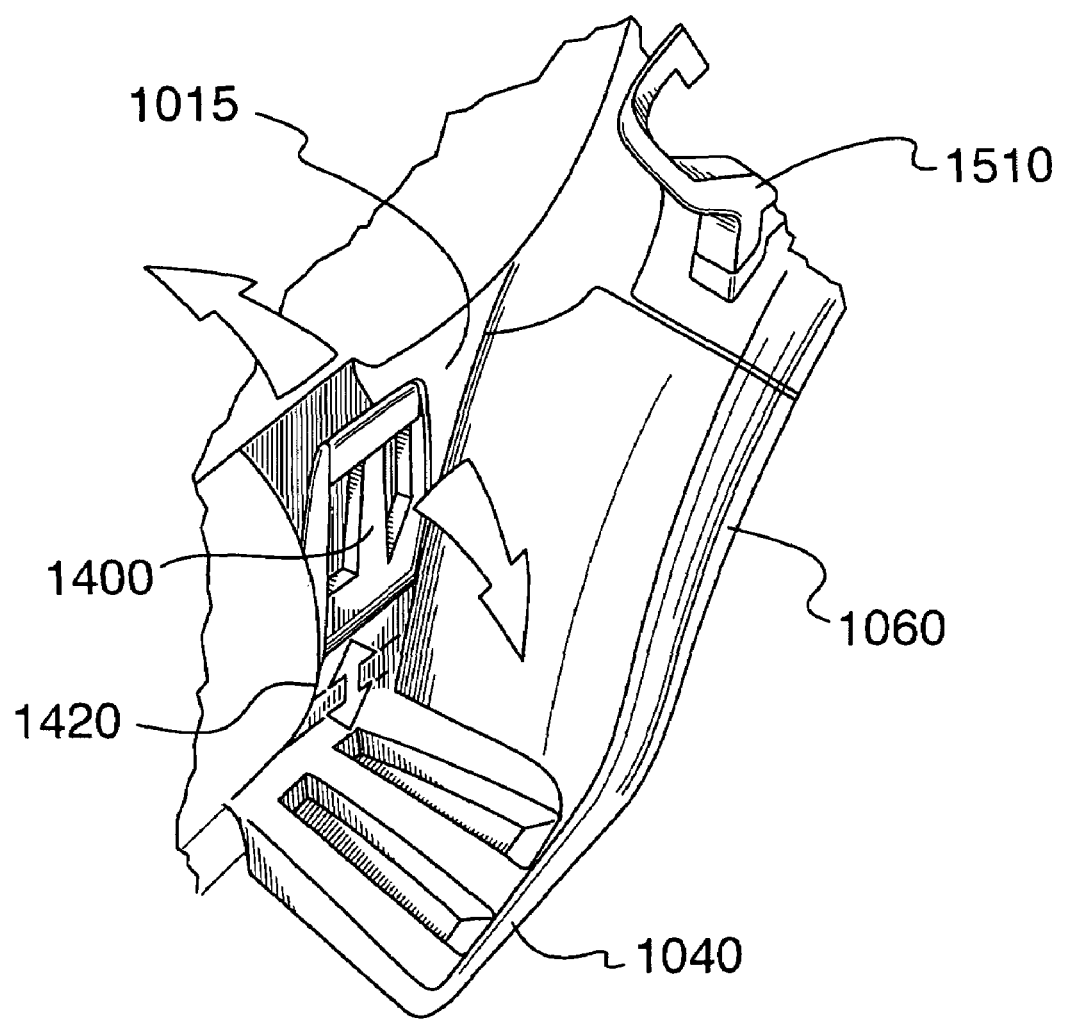
FIG. 7 is a close-up perspective view of a portion of an ATV showing the passenger footrest folded flush with a body panel in the non-supporting position.

In each of the embodiments described above, the passenger footrest may pivot or flip between a supporting position (where it is generally horizontal and perpendicular to the side of the vehicle) and a non-supporting position (where it is generally vertical and parallel to the side of the vehicle). In the non-supporting position, the passenger footrests 1400 preferably fold flush with the vehicle's frame or body paneling 1015 as shown in FIG. 7. Likewise, the adjustment mechanism 1420 may be integrated so as to be generally flush with the body paneling 1015 (i.e. lateral or side fairing) as shown in FIG. 7.

In the embodiment shown in FIG. 7, the driver footrests 1040 may extend all the way back to the rear fender 1060. This is a versatile design because when there is no passenger, the passenger footrests 1400 can be folded up flush with the body paneling 1015 to permit cargo 1700, such as a fuel container or a toolbox, to be stored on a rear portion of the driver footrest 1040 as illustrated in FIG. 8. The cargo may be secured with a restraint 1710 such as a strap or band on cargo surface 1446. A lower end of the restraint is anchored to the vehicle at an anchor point 1720 while an upper end is removably connected to the vehicle at a connection point (not shown). For smaller pieces of cargo, the footrests need not be folded up and may be latched or restrained under the passenger footrests. When a passenger wishes to sit behind the driver, the restraint 1710 is undone, the cargo 1700 is removed, and the rear footrests 1400 are flipped down from the non-supporting position (shown in FIG. 8) to the supporting position (shown in FIGS. 4, 5 and 6).

Another embodiment of the present invention includes a storage compartment in the footrest as depicted in FIG. 9. The footrest is made of injection molded plastic and forms a cavity 1430 to store cargo. This storage compartment is closed by lid 1432 and sealed by seal 1434. The lid is pivotally attached to the footrest and moves according to hinge 1436. Mechanical fasteners can be used to secure the lid to the footrest. A rotatable elongated key 1438 passes through opening 1440 and secures the lid to the footrest when turned in such a way the key is not aligned with the opening.

A locking mechanism (not shown) locks the footrest in either the foot-supporting position or the stowed position. Intermediate positions can be selected as well. A hole and plunger type locking mechanism is preferably included in the footrest so it can be released when the user desires to change the footrest position.

The folding ("flip-down") footrests may be used alone or in conjunction with the vertical adjustment mechanism. Although the folding and vertically adjustable footrests are illustrated as being the rear passenger footrests, it would be possible to make the front footrests folding or vertically adjustable as well. The folding ("flip-down") footrest can be replaced with any equivalent mechanism that permits the footrests to be moved from a supporting position to a non-supporting position. The footrests could extend and retract laterally (by sliding or swinging) from a recess in the vehicle body to a supporting position. Persons skilled in the art will appreciate that other mechanisms may be used to move the footrests from a non-supporting position to a supporting position. For instance, the retractable footrests may be spring-loaded. Optionally, a sensor may be provided to detect whether the footrest is in the non-supporting or supporting position.

Furthermore, the movable and adjustable footrests described herein can be utilized not only on one-seat, two-seat or multi-seat ATVs, but also on other types of vehicles, especially straddle-type recreational vehicles where external footrests are present. The movable and adjustable footrests may be used on snowmobiles, personal watercraft and motorcycles to provide comfort and stability to a rear passenger riding behind the driver.

The embodiments of the invention described above are therefore intended to be exemplary only. The scope of the invention is intended to be limited solely by the scope of the appended claims.

What is claimed is:

1. An ATV comprising:
   a frame;
   at least four wheels suspended from the frame, two of which are rear wheels and two of which are front wheels, the front wheels defining a front axis and the rear wheels defining a rear axis, the front axis and the rear axis defining a wheelbase of between 132 cm and 183 cm and each of the wheels including a tire;
   a power unit for driving at least one of the wheels disposed on the frame;
   a straddle seat supported by the frame including a main seat portion which is dimensioned to support a driver and a secondary seat portion, rearward of and adjacent to the main portion, which is dimensioned to support a passenger;
   handlebars disposed on the frame for steering at least one of the wheels;
   right and left passenger grab handles disposed laterally outwardly from the secondary seat portion; and
   a pair of front footrests for the driver connected to the frame and a pair of rear footrests for the passenger connected to the frame, the footrests constructed and arranged such that the feet of the driver and the passenger can both be accommodated thereon along an axis parallel to a longitudinal axis of the vehicle, the rear footrests for the passenger being movable between a foot-supporting position and a stowed position;
   the ATV being constructed and arranged such that the driver is seated in a driver position defined as the driver straddling and being seated on the seat on the main seat portion with its feet disposed on the driver's footrests and its hands disposed on the handlebars, and the passenger is seated in a passenger position defined as the passenger straddling and being seated on the seat on the secondary seat portion with its feet disposed on the passenger's footrests and its hands disposed on the grab handles.

2. The ATV of claim 1, wherein each of the wheels includes a low-pressure balloon tire having operating pressure of less than 2 $kg/cm^2$.

3. The ATV of claim 2, wherein the rear footrests for the passenger each comprise a surface adapted to simultaneously support both the ball and the heel of the passenger's feet.

4. The ATV of claim 2, further comprising a vertical adjustment mechanism associated with each footrest for adjusting a height of the footrest.

5. The ATV of claim 4, further comprising a selectively releasable locking mechanism associated with each of the rear footrests for the passenger for locking the footrest into a desired position.

6. The ATV of claim 2, wherein each of the rear footrests for the passenger is pivotably mounted to the vehicle such that each of the rear footrests pivots between the foot-supporting position and the stowed position.

7. The ATV of claim 6, further comprising a selectively releasable locking mechanism associated with each of the rear footrests for locking the footrest into a desired position.

8. The ATV of claim 6, wherein, when in the stowed position, each of the footrests is substantially flush with a side panel of the vehicle.

9. The ATV of claim 6, wherein when the rear footrests are in the stowed position, there is additional space for cargo on the vehicle.

10. The ATV of claim 9, wherein a substantially horizontal cargo surface is disposed lower than the rear footrests, and at least a portion thereof is below the rear footrests when the footrests are in the foot-supporting position.

11. The ATV of claim 9, wherein the ATV is adapted to receive a restraint associated with each cargo space for releasably securing cargo in the cargo space.

12. The ATV of claim 2, wherein each of the rear footrests for the passenger is inclinable about a transverse axis.

13. The ATV of claim 12, further comprising a selectively releasable locking mechanism associated with each of the rear footrests for locking the footrest into a desired inclination.

14. The vehicle of claim 1, wherein the passenger's footrest further includes a storage compartment.

15. The vehicle of claim 14, wherein the storage compartment is an enclosed volume.

16. The vehicle of claim 14, wherein the footrests are made of a polymeric material.

* * * * *